United States Patent [19]

Yoshinouchi et al.

[11] Patent Number: 5,126,859

[45] Date of Patent: Jun. 30, 1992

[54] CONTACT TYPE IMAGE SENSOR

[75] Inventors: Atsushi Yoshinouchi; Shuhei Tsuchimoto, both of Kita-Katsuragi, Japan

[73] Assignee: Sharp Kabushiki Kaisha, Osaka, Japan

[21] Appl. No.: 536,446

[22] Filed: Jun. 12, 1990

[30] Foreign Application Priority Data

Jun. 14, 1989 [JP] Japan .................. 1-151008

[51] Int. Cl.$^5$ .............................. H04N 1/40
[52] U.S. Cl. .................................. 358/471; 358/484
[58] Field of Search ............... 358/482, 483, 484, 471; 250/208.11; 350/96.27; 385/110, 120

[56] References Cited

U.S. PATENT DOCUMENTS

| | | | |
|---|---|---|---|
| 3,947,840 | 3/1976 | Craford et al. | 357/17 |
| 4,408,230 | 10/1983 | Tamura et al. | 358/484 |
| 4,772,951 | 9/1988 | Saito | 358/213.11 |
| 4,831,456 | 6/1989 | Takamura | 358/229 |
| 4,866,291 | 9/1989 | Shimada et al. | 250/208.1 |
| 4,908,718 | 3/1990 | Shimada | 358/482 |
| 4,939,591 | 6/1990 | Itoh et al. | 358/484 |
| 4,942,481 | 7/1990 | Yoshinouchi et al. | 358/484 |

FOREIGN PATENT DOCUMENTS

| | | |
|---|---|---|
| 0169411 | 1/1986 | European Pat. Off. |
| 1277661 | 9/1968 | Fed. Rep. of Germany |
| 1931273 | 1/1970 | Fed. Rep. of Germany |
| 3206620 | 9/1983 | Fed. Rep. of Germany |
| 2585527 | 1/1987 | France |
| 64-23667 | 1/1989 | Japan |

OTHER PUBLICATIONS

Atsushi Yoshinouch, et al., Application of Optical Fiber Array to Contact-Type Image Sensors, Japan IEMT Symposium, Apr. 26-28, 1989, Nara, Japan.

*Primary Examiner*—Edward L. Coles, Sr.
*Assistant Examiner*—Thomas L. Stoll
*Attorney, Agent, or Firm*—David G. Conlin; Robert M. Asher

[57] ABSTRACT

A contact type image sensor includes a light source for illuminating an original to be read and a substrate in which an optical fiber array member is assembled. The substrate is disposed such that one end of the optical fiber array member faces the original for transmitting a reflected light from the illuminated original therethrough. The contact type image sensor further includes a light detecting element array formed on the substrate and facing the other end of the optical fiber array member for receiving the transmitted light and converting the received light to an electrical signal. The contact type image sensor also includes a driving circuit disposed on the substrate and electrically connected to the light detecting element array for driving the light detecting element array.

10 Claims, 1 Drawing Sheet

CONTACT TYPE IMAGE SENSOR

BACKGROUND OF THE INVENTION

1. Field of the Invention

The present invention relates to a contact type image sensor which is used in an input apparatus for reading letters and images.

2. Description of the Related Art

An input apparatus for reading letters and images by use of a line sensor is adapted to read two-dimensional information such that the information on an original illuminated by a fluorescent lamp or a light emitting diode (LED) array is image-formed on the light detecting element through an optical lens, a rod lens array or an optical fiber while the original or the sensor is moved.

Such an input apparatus has a construction in a combination form of a charge coupled device (CCD) with an optical lens, or in a combination form of a long image sensor with a rod lens array or an optical fiber array. Especially, the latter so called a contact type image sensor has been in progress of development aiming at miniaturization and reduction in manufacturing cost of the facsimile or the like.

However, most of the above mentioned contact type image sensors perform an image-formation on the light detecting element through a rod lens array, thereby naturally limiting the miniaturization. In this type using a rod lens array, since the light detecting element should be apart from the original by a conjugate length of the rod lens array, which usually makes the thickness of the sensor as a unit as much as 20 mm to 30 mm. Further, in this type, since a lens system is used, an optical adjustment is required, and the chromatic aberration must be considered in case of color reading while the transmission efficiency of light quantity is low.

On the contrary, the sensor using an optical fiber array instead of such a lens system hardly requires an optical adjustment, has enough transmission efficiency of light quantity, and is suitable for miniaturization since the length of the optical fiber array can be reduced because there is no focusing in it. Further, this type using the optical fiber array has an advantage that there is no chromatic aberration in case of color reading. However, a portion of the light, which is incident on the optical fiber at an incident angle larger than the angular aperture of the optical fiber, is not totally reflected at the boundary between each optical fiber core and each clad and is transmitted to an adjacent optical fiber through the boundary as a leakage light. When this optical fiber array transmits an image information, such a leakage light deteriorates the quality of the image.

Accordingly, with an aim for absorbing such a leakage light, an optical fiber array of extra mural absorption (EMA) type, in which light absorbers are interposed between the optical fibers, is proposed. But, if this EMA type is applied to the contact type image sensor, the problem arises that the original to be read can not be illuminated.

As a solution to the above mentioned problem, the present inventors have proposed a method of utilizing, for a contact type image sensor, an optical fiber array substrate constructed by laminating one optical fiber array member, which fiber is coated with light absorber, and another fiber array member, which fiber is not coated with light absorber, in the U.S. application Ser. No. 217,681 filed on Jul. 11, 1988, now allowed U.S. Pat. No. 4,942,481 in Japanese patent application no. 62-179,635 and in the report "A NEW TYPE CONTACT IMAGE SENSOR" presented In the Springtime National General Meeting of the Electronics Information and Communication Academy No. D-134, in 1988.

However, firstly, in the construction of this new type contact image sensor, since each of the light detecting element array and the driving circuit is disposed on its exclusive substrate which is different from the substrate of the optical fiber array, there exists a great number of components in the sensor and thus, there is a certain limitation of miniaturization of the sensor. Secondly, since the substrate of the optical fiber array and the substrate of the light detecting element array are independent from each other, there is needed a positioning process to position the optical fiber array and the light receiving element array with respect to each other during or after assembling procedure.

SUMMARY OF THE INVENTION

It is therefore a first object of the present invention to provide a contact type image sensor which is suitable for miniaturization and does not require an optical adjustment.

It is a second object of the present invention to provide a contact type image sensor which has a high resolution, is suitable for miniaturization and does not require an optical adjustment.

According to the present invention, the first object can be achieved by a first contact type image sensor including a light source for illuminating an original to be read and a substrate in which an optical fiber array member is assembled. The substrate is disposed such that one end of the optical fiber array member faces the original for transmitting a reflected light from the illuminated original therethrough. The first contact type image sensor further includes a light detecting element array formed on the substrate and facing the other end of the optical fiber array member for receiving the transmitted light and converting the received light to an electrical signal. The first contact type image sensor also includes a driving circuit disposed on the substrate and electrically connected to the light detecting element array for driving the light detecting element array.

According to the present invention, the second object can be achieved by a second contact type image sensor including a light source for illuminating an original to be read and a substrate in which a composite optical fiber array member is assembled. The substrate is disposed such that on end of the composite optical fiber array member faces the original for transmitting a reflected light from the illuminated original therethrough. The composite optical fiber array member includes a first optical fiber array member on a side facing the original and a second optical fiber array member attached to the first optical fiber array member in series and optically coupled to the first optical fiber array member, each optical fiber of the second optical fiber array member being coated with a light absorber while each optical fiber of the first optical fiber array member being not coated with the light absorber. The second contact type image sensor further includes a light detecting element array formed on the substrate and facing the other end of the composite optical fiber array member for receiving the transmitted light and converting the received light to an electrical signal. The second contact type image sensor also includes a driving circuit disposed on the substrate and electrically connected to the light detecting element array for driving the light detecting element array.

In the first contact type image sensor of the present invention, the light detecting element array is formed directly on the substrate of the optical fiber array member, and the driving circuit is also disposed on the same substrate. Accordingly, there is only one common substrate needed for those three elements of the optical fiber array member, the light detecting element array and the driving circuit, and the electrical wiring between the light detecting element array and the driving circuit is simplified, resulting in reduction in the number of components and easy miniaturization of the device. Further, since the optical fiber array and the light detecting element array are contact to each other, the optical adjustment between the optical fiber array member and the light detecting element array, is not necessary.

In the second contact type image sensor of the present invention, the composite optical fiber array member includes a first optical fiber array member which fiber is not coated with a light absorber, and a second fiber array member which fiber is coated with the light absorber. The light detecting element array is formed on the substrate at the second optical fiber array member, and the driving circuit is also disposed on the same substrate. Accordingly, in addition to the effect of the above described first contact type image sensor of the present invention, the light incident on the first optical fiber array member at an angle larger than the angular aperture of each optical fiber is absorbed by the light absorber in the second optical fiber array member, while the original is well illuminated by a light generated by the light source and transmitted through the first optical fiber array member.

DETAILED DESCRIPTION OF THE PREFERRED EMBODIMENT

The preferred embodiment of the present invention will be described below with reference to the accompanying drawings.

Figure 1:
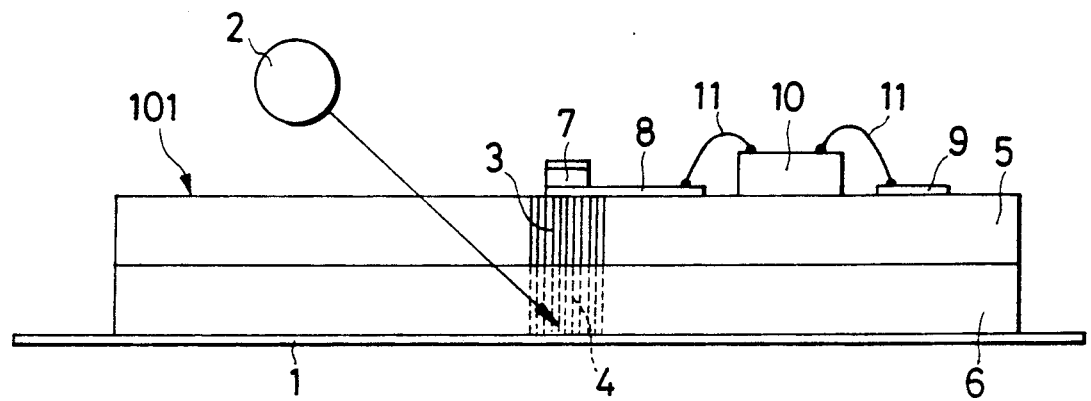
FIG. 1 is a schematic sectional view showing a first embodiment of the present invention.

FIG. 1 shows a contact type image sensor 101 as a first embodiment of &he present invention.

In FIG. 1, the reference nummeral 1 designates an original positioned under the image sensor 101. The image sensor 101 includes a light source 2 such as a LED array source, and an optical fiber array members 3 and 4 each composed of a large number of optical fibers bundled in a band like manner. Each optical fiber of the array member 3 is coated with a light absorber, while each optical fiber in the array member 4 is not coated with a light absorber.

The array member S is assembled in a substrate 5. The array member 4 is assembled in a substrate 6. The substrates 5 and 6 are attached to each other such that the array members 3 and 4 are arranged in series and optically-coupled to each other.

On the substrate 5, there are formed a thin film light detecting element array 7, a leading-out electrode 8, a wiring electrode 9 and a large scale integrated circuit (LSI) 10 for driving the detecting element array 7. The LSI 10 is electrically connected to the electrodes 8 and 9 by use of bonding wires 11.

The light source 2 is disposed in a space over the substrate 5 at a side opposite to the leading-out electrode 8 with respect to the detecting element array 7, so that the original 1 is illuminated by the light from the light source 2 through the substrates 5 and 6, and the array member 4.

The operation of the array sensor 101 will be explained below.

When the original 1 is illuminated by the light source 1, the image information on the original 1 is transmitted through the array member 4 and then through the array member 3 to the detecting element array 7 as a reflected light. Then, the detected image information is converted to an electrical signal at the detecting element array 7 and transmitted to the LSI 10 through the leading-out electrode 8 and the wire 11.

In the image sensor 101, since the array member 4 has no light absorber, the original 1 can be illuminated with a large quantity of the light through the array member 4. When the image information, which is the reflected light from the original 1, is passing through the array member 4 which has no light absorber, it is deteriorated in image due to the leakage light between the adjacent optical fibers. When the image information is passing through the array member 3 which has the light absorber, the unnecessary leakage light is cut off by the light absorber, then only the necessary image information is transmitted to the detecting element array 7.

Accordingly, the original 1 can be efficiently illuminated by the light source 2, and the image information on the original 1 can be transmitted to the detecting element array 7 without deterioration of the quality of the image information.

In the array sensor 101, a light shielding means may be provided at such a position that the light from the light source 2, which would be directly transmitted to the detecting element array 7 and deteriorate the quality of the image information, is cut-off before reaching the detecting element array 7. Such a light shielding means may be formed by a packaging resin for packaging the detecting element array 7 and the LSI 10 onto the substrate 5.

A manufacturing procedure of the image sensor 101 will be explained below in its sequence.

(A) The substrate 5 is prepared in which the array member 3 having light absorbers is assembled. Then, a transparent electrode pattern is formed on the substrate 5. The transparent electrode pattern has, for example, a resolution of 8 pct/mm and 1728 dots. The transparent electrode pattern is made of, for example, an ITO (In$_2$O$_3$:Sn) thin film.

(B) An a-Si:H film is deposited on the transparent electrode pattern by means of a plasma CVD (Chemical Vapour Deposition) technique etc., and the unnecessary portion of thus deposited film is removed by an etching technique for forming the detecting element array 7. Then, upper electrodes for the detecting element array 7 are formed to complete the light detecting element array 7.

(C) On the portion of the transparent electrode pattern where the leading-out electrode 8 is to be formed, a conductive metal such as aluminum is Layered so as to increase the conductivity of the pattern and also form wire bonding pads to complete the leading out electrode B. The wiring electrode 9 is formed in the same manner.

(D) The LSI 10 is die-bonded on the substrate 5 and the electrode pads of the LSI 10 and the wire bonding pads of the electrodes 8 and 9 are wire-bonded by use of the wire 11.

(E) The detecting element array 7 and the bonded portion of the LSI 10 is packaged by a packaging resin which also serves as the light shielding means.

(F) The substrate 6 is prepared in which the array member 4 having no light absorbers is assembled. Then, the substrate 6 is bonded to the substrate 5 by use of a photo-curing resin as shown in FIG. 1.

The use of the photo-curing resin, i.e., a resin which can be set or consolidated by light brings an advantage of bonding the array members 3 and 4 in a good optical-coupling condition. If a natural setting type adhesive is used, it is difficult to remove a bubble in the adhesive induced at the bonding moment, thus it is difficult to achieve a good optical coupling there. On the contrary, the light setting resin allows an enough bubble removing procedure before setting, resulting in a good bonding between the array members 3 and 4 in an optical sense.

According to the above mentioned manufacturing procedure, and by utilizing as the light source 2 a LED array having no rod like lens, the unit size of the image sensor 101 is reduced to achieve such a thin type that the thickness is 4.5 mm, the width is 25 mm, and the length is 255 mm.

As described above, by forming the light detecting element array 7 on the substrate 5 in which the fiber array member 3 is assembled, and by packaging the LSI 10 on the substrate 5, the image sensor 101 having a high resolution and being a very thin type to which an optical adjustment is not necessary, can be manufactured.

Figure 2:
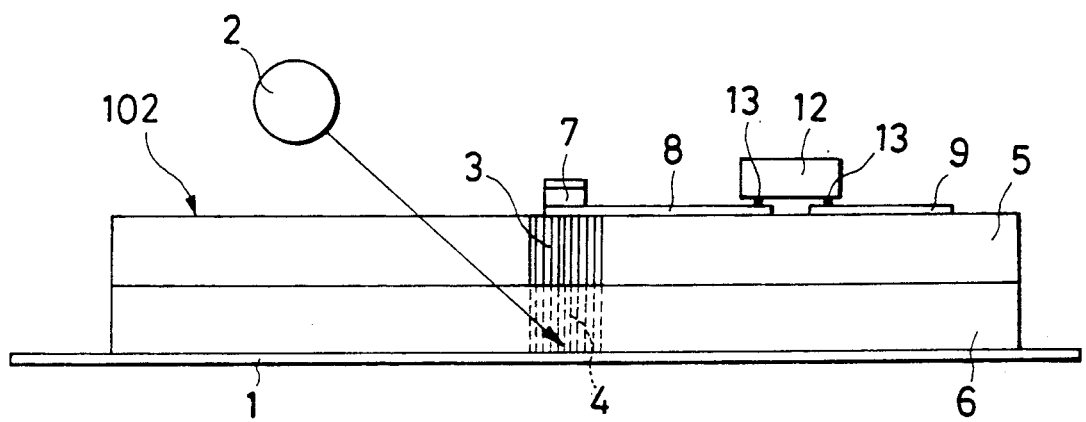
FIG. 2 is a schematic sectional view showing a second embodiment of the present invention.

FIG. 2 shows a contact type image sensor 102 as a second embodiment of the present invention. In FIG. 2, the same elements as those in FIG. 1 carry the same reference numerals and the explanations thereof are omitted.

In FIG. 2, the LSI 12 for driving the detecting element array 7 is installed to the substrate 5 by means of the flip-chip-bonding technique, in which the electrode terminals of the LSI 12 are attached onto the electrodes 8 and 9 by a bonding medium 13. Thus, compared with the first embodiment, the second embodiment has an advantage in its packaging process of the LSI 12 where the electrical connection can be achieved at once while the electrode terminals of the LSI 12 can be increase in its density.

Figure 3:
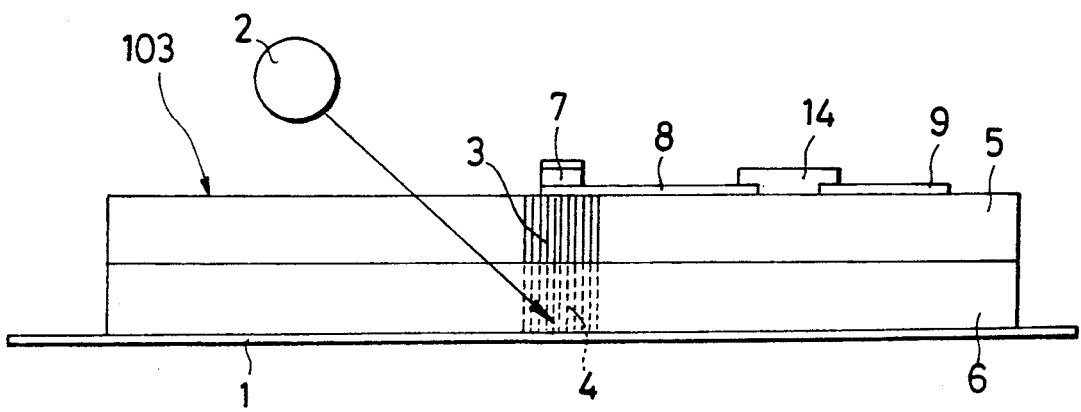
FIG. 3 a schematic sectional view showing a third embodiment of the present invention.

FIG. 3 shows a contact type image sensor 103 as a third embodiment of the present invention. In FIG. 3, the same elements as those in FIG. 1 carry the same reference numerals and the explanations thereof are omitted.

In FIG. 3, a driving circuit 14 for driving the detecting element array 7 is formed directly on the substrate 5 by means of a thin film forming technique. Thus, compared with the first and second embodiments, the third embodiment has an advantage in its production process where bonding process of the driving circuit is omitted.

A manufacturing procedure of the image sensor 102 of the second embodiment is similar to the above described case of the image sensor 101 of the first embodiment except in the process (D), the LSI 12 is flip chip-bonded onto the substrate 5 by use of the bonding medium 13.

A manufacturing procedure of the image sensor 103 of the third embodiment is also similar to the above described case of the image sensor 101 of the first embodiment except in the process (D), the driving circuit 14 is formed on the substrate 6 by use of the thin film forming technique.

As described above, the embodiment ®of the present invention are suitable for miniaturization because the light detecting element array is formed directly on the substrate for the optical fiber array member and because the driving circuit is constructed on the same substrate. The use of the optical fiber which optical path can be extremely shortened allows an extreme miniaturization of the embodiments as compared wi±h the conventional case using the rod lens array. Further, because the number of the components is thus reduced, the embodiments are suitable for a mass-production, and because the light detecting element array is thus formed on the optical fiber array member, there is not needed an optical adjustment during or after the manufacturing procedure. The embodiments of the present invention can maintain the high resolution of image-formation because the second optical fiber array member consists of the optical fibers coated with the light absorbers which cut-off the leakage light while the original is well illuminated by the light through the first optical fiber array member which consists of the optical fibers not-coated with the light absorber.

Many widely different embodiments of the present invention may be constructed without departing from the spirit and scope of the present invention. It should be understood that the present invention Is not limited to the specific embodiments described in this specification, except as defined in the appended claims.

What is claimed is:

1. A contact type image sensor comprising:

a light source for illuminating an original to be read;

a substrate, in which a composite optical fiber array member having first and second ends is assembled, disposed such that said first end of said composite optical fiber array member faces said original for transmitting a reflected light from said illuminated original therethrough, said composite optical fiber array member including a first optical fiber array member, positioned at said first end of said composite optical fiber array member facing said original, and a second optical fiber array member, positioned at said second end of said composite optical fiber array member, attached to said first optical fiber array member in series and optically coupled to said first optical fiber array member, each optical fiber of said second optical fiber array member being coated with a light absorber while each optical fiber of said first optical fiber array member being not coated with said light absorber;

a light detecting element array formed on said substrate and facing said second end of said composite optical fiber array member for receiving said transmitted light and converting said received light to an electrical signal; and a driving circuit disposed on said substrate beside said light detecting element array and electrically connected to said light detecting element array for driving said light detecting element array.

2. A contact type image sensor according to claim 1, wherein said substrate comprises two laminated substrates one of which includes said first optical fiber array member and the other of which includes said second optical fiber array member.

3. A contact type image sensor according to claim 1, wherein said first optical fiber array member and said second optical fiber array member are attached to each other by a photo-curing adhesive.

4. A contact type image sensor according to claim 1, wherein said driving circuit comprises a large scaled integrated circuit.

5. A contact type image sensor according to claim 1, wherein said driving circuit is die-bonded on said substrate and electrically connected to said light detecting element array by means of a wire-bonding technique.

6. A contact type image sensor according to claim 1, wherein said driving circuit is attached on said substrate by means of a flip-chip-bonding technique.

7. A contact type image sensor according to claim 1, wherein said driving circuit is formed on said substrate by means of a thin film forming technique.

8. A contact type image sensor according to claim 1, wherein said light detecting element array is formed on said substrate by means of a thin film forming technique.

9. A contact type image sensor according to claim 1, wherein said substrate is provided with a transparent electrode layer on which said light detecting element array is formed.

10. A contact type image sensor according to claim 1, wherein said light source comprises a light emitting diode array.

* * * * *